United States Patent Office 3,300,598
Patented Jan. 24, 1967

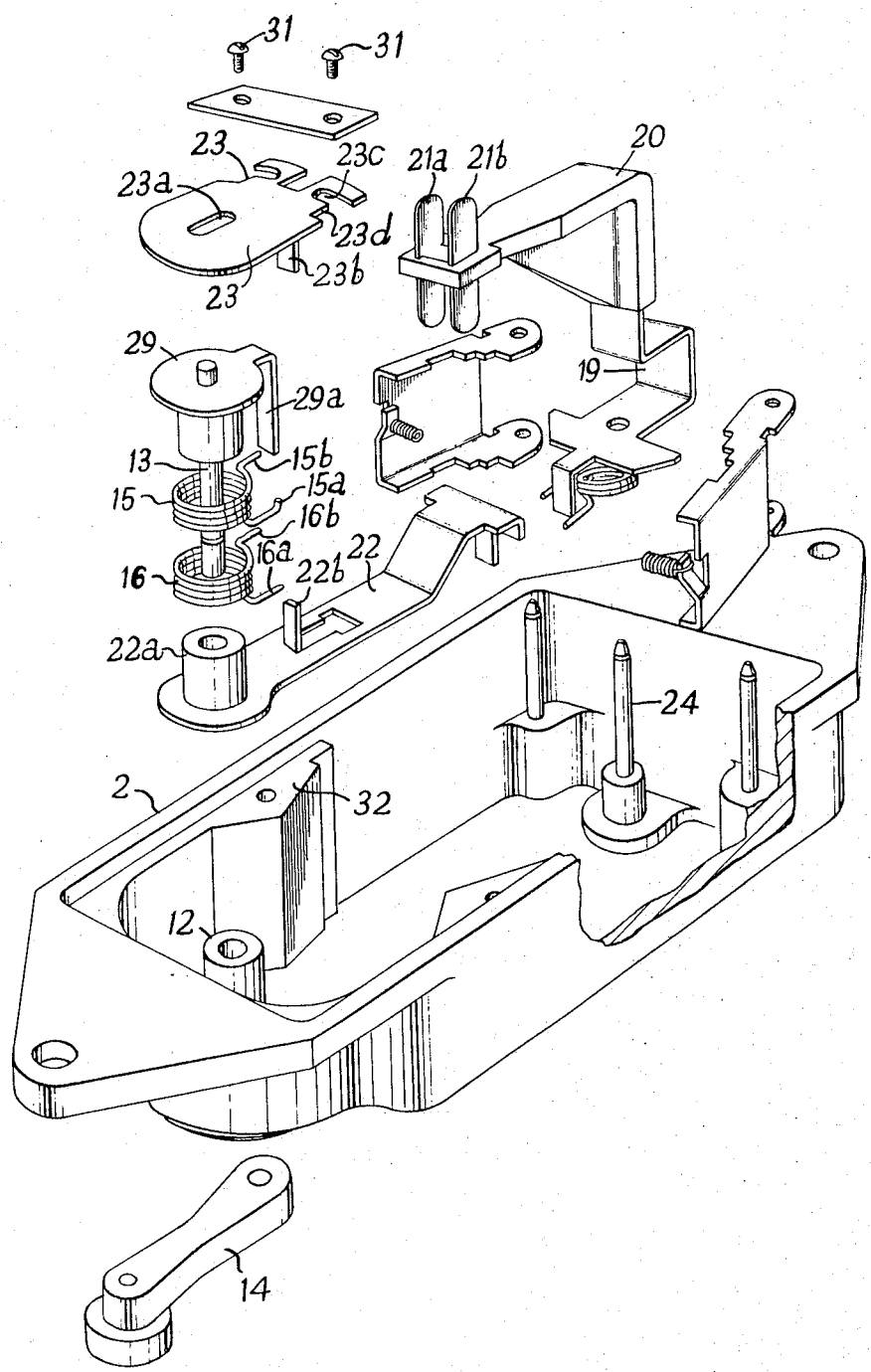

3,300,598
ELECTRICAL LIMIT SWITCHES
Harold Richard Scott, Eltham, London, Louis Allan Davis, Swindon, and Peter John Fogaty, Ashburton, England, assignors to The Birmingham Small Arms Company Limited, Birmingham, England, a British company
Filed Mar. 10, 1965, Ser. No. 438,586
Claims priority, application Great Britain, Mar. 19, 1964, 11,700/64
2 Claims. (Cl. 200—47)

The present invention relates to electric limit switches and has for an object to provide an improved switch which, without even partial dismantling can be selectively set for bias to either of the two end positions. With this object in view the invention consists in an electrical limit switch comprising a switch-operating shaft which is selectively biased to one or the other of two or more angular positions by a spring which clamps two dogs arranged for movement about the axis of the shaft, one of the dogs being connected with the shaft for common movement therewith and the other being arranged on a member so mounted on a fixed stationary part of the switch as to allow said other dog to be moved without dismantling to, and to be secured in, each of two or more positions mutually displaced angularly about the axis of the shaft. The preferred form of the invention includes additional features which make it possible to render the bias optionally inoperative, whilst other features enable an operating lever of the switch to overtravel the end position of the switch without producing excessive strain.

In order that the invention may be more readily understood, switch operating mechanism incorporating one embodiment of the invention will now be described in more detail with reference to the accompanying drawing, which is an exploded view of the replaceable switch-actuating unit of a switch of the kind described in our co-pending U.S. patent application No. 415,044.

Referring now to the drawing, in which the same reference numbers as in our said co-pending application have been used for parts referred-to in the latter, the actuating unit comprises a housing 2 in which a shaft 13 is rotatably supported by a bush 12. The end of the shaft 13 projects through the bush to the outer side of the housing, where an operating lever 14 is attached to it. The lever 14 will turn the shaft when it is struck, for example, by a stop, not shown, secured on a machine-tool slide. A switch-actuating arm 22 which serves for transmission of the movement from the shaft 13, is pivotally mounted on the bush 12 by a bush 22a and is formed with an axially projecting coupling dog 22b, which projects between the two parallel ends 16a and 6b of a helical spring 16 placed round the bush 22a. At an axial distance from the bush 22a the shaft 13 is equipped with a boss 29 in the form of a flanged bush, from which a drive dog 29a extends towards the arm 22, in the axial direction of boss 29 and at a radial distance from the axis of the shaft 13 which is smaller than that of the dog 22b so that the dog 29a will not strike the dog 22b when the shaft 13 is rotated relative to the arm 22. The drive dog 29a is straddled by the two ends 15a and 15b of a helical bias spring 15, which is centered on the boss 29 and whose purpose will become apparent further below, and projects beyond the arms 15a and 15b sufficiently to be also straddled by the arms 16a and 16b of the above-mentioned spring 16. As will now be appreciated, the spring 16 acts to couple the actuating lever 22 to the shaft 13 with the help of the dogs 22b and 29a. The spring 16 is preferably so constructed that the arms 16a and 16b will normally rest under a preload against the edges of the dogs 22b and 29a so that the arm 22 will follow the movement imparted to the shaft 13 by the lever 14 without backlash except when the lever 22 is prevented from movement by a stop or its equivalent. When, at the end of the switch operation, the lever 22 is prevented from further movement, the spring 16 will allow overtravel of the operating lever 14 while limiting the resultant stress on the mechanism to an amount not much exceeding that determined by the preloading of the spring 16.

The spring 15 serves to provide bias to the shaft 13 when the switch is intended to stay in, and return automatically to, one predetermined position unless the lever 14 is engaged by a stop or the like. For this purpose a bias plate 23 having an aperture 23a for the end of the shaft 13, is secured to the housing member 2 by being clamped, with the help of a clamping plate 30 and two screws 31, to a support surface 32 in the housing member 2.

The bias plate 23 carries a dog 23b which normally has a radial distance from the axis of the shaft 13 substantially equal to that of the dog 22b of lever 22, but which ends short of the latter. The dog 23b is thus embraced, jointly with the dog 29a of the boss 29, by the arms 15a and 15b of the bias spring 15, which is preloaded to normally hold the centres of dogs 23b and 29 in a common radial plane. That part of the bias plate 23 which projects under the clamping plate, is provided with lateral recesses 23c for the passage of screws 31, and these recesses are so dimensioned as to permit the plate 23, when the dog 23b is thus engaged between the arms 15a and 15b of the spring 15, to be turned about the shaft 13 between two end positions in which the co-operation of the dogs 23b, 29a and 22b respectively urges the actuating lever 22 to its two end positions and the arm 14 in each case to its corresponding end position so that, when the plate 23 is clamped in either position, the switch will tend to move automatically to the thus selected end position. If desired, the plate 23 may also be set in a middle position, with the result that the switch is then biased to a central position. It will be further noticed that the opening 23a is shown elongated and the plate 23 has two setback edge portions 23d extending in the direction of this elongation. This allows the plate 23 when in its central position of rotation to be moved to disengage its dog 23b from the prongs 15a and 15b of the bias spring 15, thus allowing the switch to be employed without any bias whatsoever.

A contact-carrier arm 19 pivoted on a pin 24 and carrying contacts 21a, 21b is coupled to actuator arm 22, and snap action of the contact-carrier arm is produced in a manner which is described in our co-pending patent application Serial No. 451,774.

What we claim is:
1. In an electric limit switch, the combination comprising: a housing have a support surface; a switch-operating shaft mounted in the housing for pivotal movement about an axis perpendicular to said surface and having a dog connected thereto, at a radial distance from this axis, for common pivotal movement therewith; a bias plate having an aperture for the passage of the shaft and at least two edge portions approximately tangential to a circle about the said axis and angularly displaced thereabout, said plate being supported adjacent to said edge portions on said support surface with the shaft passing through said aperture; two clamping screw-and-nut means, whose screws project from the support surface of the housing adjacent respectively to said edge portions of the plate so as to permit pivotal movement of the bias plate about the shaft said screw-and-nut means having clamping surfaces engageable with the surface of the bias plate adjacent to said edge portions to lock the bias plate against such pivotal movement, the bias plate further having a dog portion spaced radially from said aperture and alignable in the direction of said axis with said dog of the operating shaft, and clasping spring means jointly embracing said dog and dog portion and urging them into mutual alignment, the aperture of the bias plate being elongated to permit the plate to be moved in a direction corresponding to the radius extending through said dog portion to permit, when said screws are slackened and the plate is in a predetermined position, displacement of said plate in the direction of said radius to withdraw said dog portion from engagement with said clasping spring means, said bias plate including a portion having a width approximately equal to the distance between said screw members and extending from said edge portions in the direction of said radius in a radially inward direction.

2. The combination as claimed in claim 1, wherein the bias plate is formed with a pair of oppositely extending slots having a width approximately equal to the diameter of said screws, said edge portions being each constituted by one side of one of said slots.

References Cited by the Examiner

UNITED STATES PATENTS

| | | | |
|---|---|---|---|
| 2,822,439 | 2/1958 | Schaefer et al. | 200—70 |
| 3,097,271 | 7/1963 | Denison | 200—47 |

ROBERT K. SCHAEFER, *Primary Examiner.*

R. S. MACON, D. SMITH, *Examiners.*